United States Patent [19]
de Poly

[11] Patent Number: 5,036,792
[45] Date of Patent: Aug. 6, 1991

[54] APPARATUS FOR CONTROLLING EMISSION, AND RECOVERY, OF SOLVENTS

[76] Inventor: Christian L. C. de Poly, 6725 Brookfield Dr., Charlotte, N.C. 28226

[21] Appl. No.: 438,599

[22] Filed: Nov. 17, 1989

[51] Int. Cl.⁵ ............................................. B01D 5/00
[52] U.S. Cl. ...................................... 118/61; 118/64; 118/69; 118/326
[58] Field of Search .................. 118/61, 64, 69, 70, 118/324, 326; 427/398.1, 398.5; 239/124, 128

[56] References Cited

U.S. PATENT DOCUMENTS

| | | | |
|---|---|---|---|
| 2,486,877 | 11/1949 | Ransburg et al. | 118/DIG. 7 |
| 3,387,927 | 6/1968 | Goldberger | 23/126 |
| 3,486,848 | 12/1969 | Hendrix | 23/121 |
| 4,261,707 | 4/1981 | Bradshaw et al. | 118/61 |
| 4,407,316 | 10/1983 | Ihringer | 134/104 |

*Primary Examiner*—Richard V. Fisher
*Assistant Examiner*—Charles Friedman
*Attorney, Agent, or Firm*—Rhodes, Coats & Bennett

[57] ABSTRACT

The invention relates to an apparatus and method for controlling the emission, and recovery, of volatile solvents. In particular, this invention relates to a type of finish material applying apparatus which has become known as a robotized spraying cabinet and to methods of operating such an apparatus. In accordance with this invention, materials sprayed through the spray head and which escape adherence to a sprayed articles impinge onto overspray directing members disposed adjacent the conveyor and between the conveyor and the reservoir, a quantity of solvent for the finishing materials is retained at a location adjacent the conveyor and supplying for use in cleaning the conveyor, and the overspray directing members and retained solvent to be supplied for cleaning are chilled and thereby the vapor pressure of the volatile solvent is reduced, whereby the volatile solvent is maintained in liquid form and control over the emission thereof is facilitated.

19 Claims, 2 Drawing Sheets

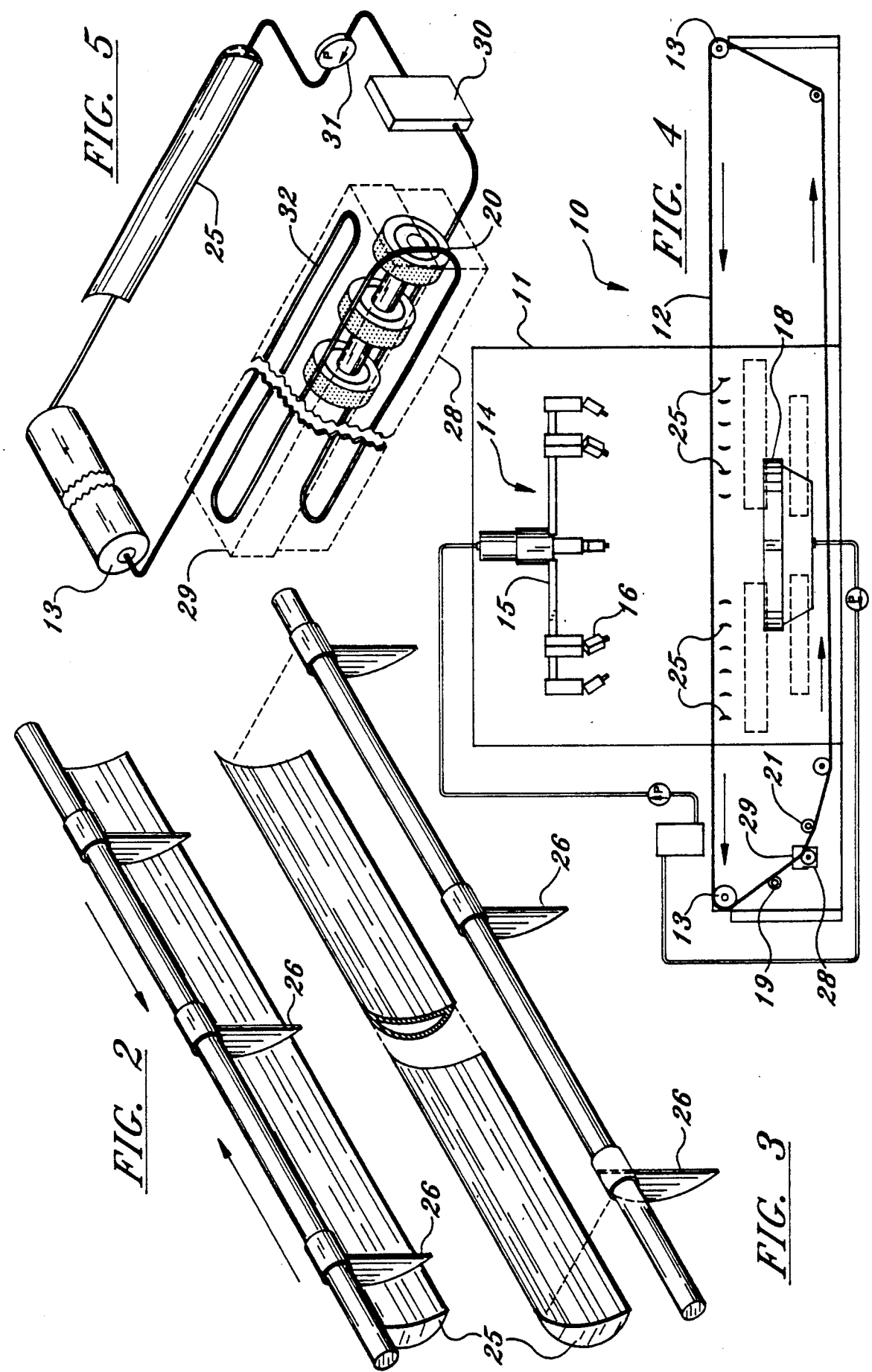

APPARATUS FOR CONTROLLING EMISSION, AND RECOVERY, OF SOLVENTS

FIELD AND BACKGROUND OF INVENTION

This invention relates to an apparatus and method for controlling the emission, and recovery, of volatile solvents. In particular, this invention relates to a type of finish material applying apparatus which has become known as a robotized spraying cabinet and to methods of operating such an apparatus.

The application of finish materials to panels such as are used in the assembly of cabinets, office furniture, and so-called "knocked down" or KD furniture for residences is a well developed art. Much attention has been given to the development of finish materials themselves and to apparatus and methods of applying those materials. Many such finish materials are based on chemistry which uses volatile solvents as components of paint, lacquers, and other finishes. Such finish materials have been applied by spraying, by curtain flow, and in other manners.

One type of apparatus which provides a context for this invention is characterized by having an enclosed space (sometimes called a cabin) which is traversed by a conveyor on which panels or the like which are to receive finish materials are transported. Within the space is mounted a carousel head mounting a plurality of spray heads which are supplied with the finish materials to be applied and are rotated with the carousel head. Means, preferably in the form of some central processor control, are provided for sensing the configuration of the workpieces to be finished and the placement of the workpieces on the conveyor. In response to the sensed configuration and placement of a workpiece, the spray heads are activated to apply finish materials essentially only to the workpieces passing through the enclosed space. A flow of air is drawn or pushed through the area where finishing materials are applied in order to assist in controlling the emission of solvents and finishing materials.

It is known that apparatus of this general type may be constructed and operated without an enclosing cabinet or cabin and using spray heads which move about a circular path, an oval path, reciprocate, are fixed relative to conveyed workpieces, or move in other ways including being manually operated. Further, it is known that a variety of apparatus may be used in conveying workpieces through an area in which finishing materials are applied by spraying. It is contemplated that this invention, as described hereinafter, may be adapted to such alternative apparatus environments.

At least two problems with the emission of volatile solvents which form components of the finish materials arise in such an apparatus and method. One flows from the necessity, in order to assure full coverage of a workpiece with finish, of overspraying. That is, activation of a spray head must begin before the head traverses a workpiece and continue for at least a minimal distance beyond such traverse. Thus there is inevitably an overspray quantity of finish material released in the cabin and the volatile solvents contained in such materials may be easily vaporized and emitted into the ambient atmosphere.

The other of the two problems to be addressed here arises out of the need to clean the conveyor between passes through the cabin. More particularly, overspray of finish materials inevitably leads to deposition of such materials onto the conveyor and, if the conveyor continues uncleaned, to significant accumulation of such materials. With significant accumulation of finish materials on the conveyor, workpieces placed on the conveyor for transport would become stuck to the conveyor or otherwise contaminated with old finish materials, adversely affecting the quality of the finish applied. However, cleaning of the conveyor requires use of volatile solvents for the finishing system in use. Thus, any quantity of solvent retained for cleaning purposes is a source for evaporation into the ambient atmosphere.

The volatile solvents used in many finishing systems and materials have significant chemical and biological activity, such that governmental agencies concerned with the welfare of employees and the general public impose restrictions on the emission of such solvents. In order to assure that emissions are kept at or below required level, it is important to control such evaporation as has been described. Further, were the evaporation controlled (as proposed hereinafter), then the finish materials become available for recycling and reuse, thereby conserving the materials. As can be appreciated, as the solvent evaporates, the finish begins its drying and hardening. This is usually an irreversible process, especially if it takes the form of polymerization, as is often the case.

BRIEF DESCRIPTION OF INVENTION

With the foregoing in mind, it is an object of this invention to improve apparatus and methods of the types described by controlling the evaporation and emission, and recovery, of volatile solvents used in finishing materials applied to workpieces. In realizing this object of the present invention, means are provided for controlling the direction of overspray materials and bringing such materials into contact with members which facilitate lessening the evaporation and increasing the recovery of such materials.

Yet a further object of this invention is to control the evaporation and emission of solvents supplied for cleaning of a conveyor in an apparatus as here described. In realizing this object of the invention, a quantity of solvent supplied for cleaning is retained in a means which is chilled to reduce the vapor pressure of the solvent and thereby lessen emission of the solvent.

BRIEF DESCRIPTION OF DRAWINGS

Some of the objects of the invention having been stated, other objects will appear as the description proceeds, when taken in connection with the accompanying drawings, in which:

FIG. 2 is an enlarged schematic perspective view of a portion of the apparatus of FIG. 1;

FIG. 3 is a view similar to FIG. 2 showing the components of that view exploded away one from the other and with one component broken away;

FIG. 4 is a schematic elevation view of the apparatus of FIG. 1; and

FIG. 5 is a schematic perspective view of refrigerated portions of the apparatus of FIGS. 1 through 4.

DETAILED DESCRIPTION OF INVENTION

Figure 1:
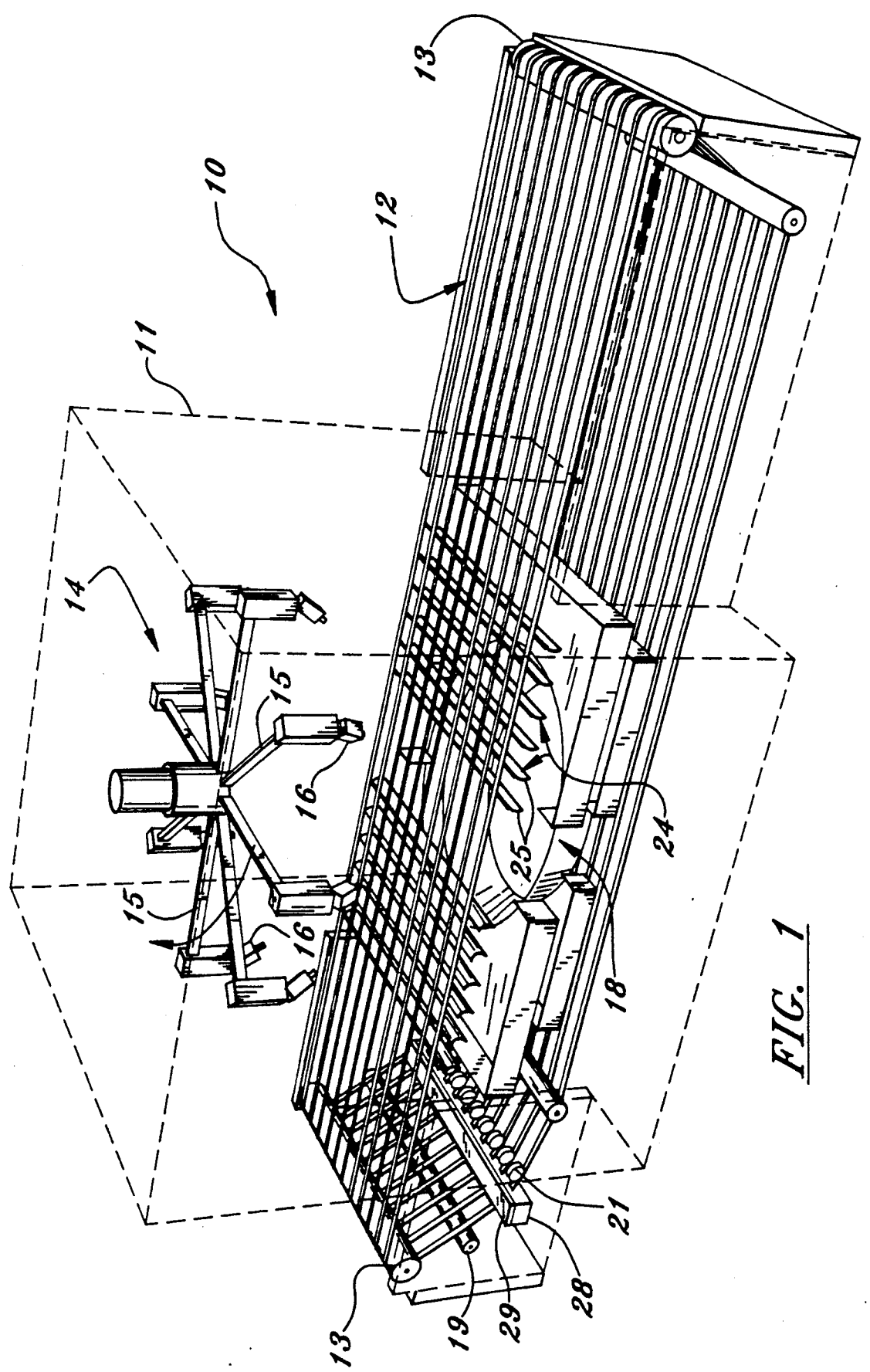
FIG. 1 is a schematic perspective view of an apparatus constructed in accordance with this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, an apparatus as contemplated by the present invention is there shown and generally identified at 10. The apparatus 10 has a cabinet or cabin 11 defining an enclosed finish applying zone in which finishing materials are to be applied to workpieces. The zone is traversed by a conveyor generally indicated at 12, which may be in the form of a plurality of bands or in some other form such as rollers or a series of bars extending laterally of a pair of chains, depending at least in part on the nature of the workpieces to be finished. It is contemplated that this invention is applicable to apparatus of the general type described without regard to the specific form of the conveyor used. It will be understood by the person skilled in the applicable arts that appropriate means are provided for conveying workpieces. It will further be understood that such means may take any of a wide variety of forms, limited only by the imagination of a knowledgable designer.

Within the cabinet or cabin 11 is mounted a carousel spray head indicated generally at 14. The carousel head is mounted for rotation about a central axis (here indicated as a vertical axis) and preferably has a number of radial arms 15, each of which mounts a corresponding spray head 16. The spray heads are provided with appropriate services to deliver the finish materials to be applied, which may be sprayed by any suitable technique of spraying, including by air pressure, by electrostatic application, by airless pressure applied only to the finish materials, or by a technique which combines more than one of such approaches. The spray heads are mounted to one side of the conveyor 12. In the form of apparatus shown, the spray heads are mounted for rotation above the conveyor. In alternate forms, other arrangements may be used to accommodate alternate ways of moving or fixing the position of the spray heads.

On the other side of the conveyor from the spray heads (below the conveyor in the form of apparatus shown) is mounted a reservoir for collecting any excess of finishing materials delivered by the spray head and indicated generally at 18.

After leaving the spray zone, the conveyor 12 passes to a workpiece delivery area and then turns about one of a pair of guide rolls 13 to return toward the entry side of the cabin 11. In the form of apparatus shown, the conveyor 12 is cleaned of any overspray material which has impinged thereon by a scraper 19 and then passes to a series of cleaning rolls 20 and 21, at least one set of which are supplied with solvent for cleaning the conveyor. Material scraped from the conveyor by the scraper 19 may be gathered and recycled into the finish applying system.

In accordance with the present invention, and in order to reduce the emission of volatile solvents and facilitate recovery of finish materials, overspray directing means (indicated generally at 24) are disposed adjacent the conveyor and between the conveyor and the reservoir for receiving materials sprayed through the spray head and which escape adherence to a sprayed workpiece and directing such overspray materials toward the reservoir while protecting against backsplatter toward the sprayed workpiece. In the form shown, the directing means 24 comprises a plurality of elongate slat members 25 arranged parallel one to the other and perpendicular to the direction of movement of the conveyor 12. The slat members 25 are oriented with the lengthwise axis thereof extending widthwise of the conveyor 12 for substantially the entire width of the conveyor and have side edges and a predetermined depth extending from the one of the side edges closest to the conveyor toward the reservoir.

It is contemplated that the directing members may be oriented differently than shown or take other forms. In particular, where the spray heads are mounted to move along a particular path, the members 25 may be arranged to extend (for example) parallel to the bands of a conveyor or in arcs about a center. The knowledgeable designer will position the members for intercepting any overspray from whatever direction such overspray is likely to be directed. Further, the knowledgeable designer may choose to give the members configurations other than that shown, such as by forming the members into cells of regular geometric shapes such as hexagons or squares.

In order to facilitate the recovery of finish materials which may adhere to the slat members 25, means are provided for scraping from the slat members finish materials deposited thereon. The scraping means preferably takes the form of a plurality of blade means 26 mounted for movement longitudinally of the slat members and for engaging the slat members on depthwise faces thereof (FIGS. 2 and 3).

Alternatively, the overspray directing means may take some form other than the somewhat airfoil shape shown in the drawings and which especially accommodates the collection of finishing materials for recirculation. One example might be a slat-like member having an upstanding central web bounded by a foot or the like formed by one or two projecting elements which form gutters in which collected material may flow. Collected material may then be drained from the gutter(s) and recycled.

As mentioned hereinabove, at least one set of the cleaning rolls 21, 20 is supplied with solvent for cleaning the conveyor 12. In accordance with the present invention, and in order to facilitate controlling the emission of volatile solvents, retention means are disposed adjacent the conveyor and the cleaning rolls for receiving and retaining a quantity of solvent for the finishing materials and for supplying retained solvent to the cleaning rolls. In the form of the invention illustrated, the retention means comprises trough means 28 mounted on one side of the conveyor and cover means 29 mounted on the opposite side of the conveyor from the trough 28, the trough and cover together defining at least one slot for passage of the conveyor 12 therethrough.

In accordance with an important characteristic of this invention, refrigeration means are provided for chilling elements of the apparatus and thereby lowering the temperature of finishing materials and reducing the vapor pressure of the volatile solvents contained in the finishing materials, whereby the volatile solvents are maintained in liquid form and control over the emission thereof is facilitated. The refrigeration means may, for example, chill one or more of the conveyor, the overspray direction means and the retention means for lowering the temperature of solvent contacting those elements or received and retained in the retention means. More specifically, the refrigeration means comprises any appropriate mechanical refrigeration producer indicated generally at 30 such as an expansion cycle compressor and associated components for chilling a circulating fluid such as water which may be conveyed by suitable means such as a pump 31 to pass through the slat members 25, through a suitable conduit 32 mounted on one of the trough 28 and the cover 29, through one or more of the guide rollers 13 for the conveyor 12, and through a suitable conduit mounted on the collecting reservoir 18.

Alternatively (and apart from the arrangements shown in the accompanying drawings), the refrigeration means may be applied to chill the conveyor 12 or the air flowing through the apparatus 10, to the same effect described above. Other means than a mechanical refrigeration producer may be used, such as metals or the like which have eutectic characteristics and will store cold for extended intervals of time and take up heat so as to chill air or finishing materials coming in contact with apparatus elements constructed of such metals.

In using the apparatus of this invention, a method is practiced for applying volatile solvent containing finishing materials to workpieces having the steps of supporting articles to be sprayed on a moving conveyor and transporting the supported articles through a finish applying zone while applying the finish materials to the articles with a spray head as the transported articles pass through the zone, capturing any overspray of finish materials in a reservoir mounted to the side of the conveyor opposite the location of the spray head, and cleaning from the conveyor any overspray of finish materials which has impinged thereon, with the process being improved by steps which facilitate controlling emissions of solvent into the atmosphere ambient to the apparatus and comprising impinging materials sprayed through the spray head and which escape adherence to a sprayed articles onto overspray directing members disposed adjacent the conveyor and between the conveyor and the reservoir, retaining a quantity of volvent for the finishing material at a location adjacent the conveyor and supplying retained solvent for use in the step of cleaning the conveyor, and chilling the overspray directing members and retained solvent to be supplied for cleaning and thereby reducing the vapor pressure of the volatile solvent, whereby the volatile solvent is maintained in liquid form and control over the emission thereof is facilitated.

In the drawings and specifications there has been set forth a preferred embodiment of the invention and, although specific terms are used, the description thus given uses terminology in a generic and descriptive sense only and not for purposes of limitation.

What is claimed is:

1. In an apparatus having a conveyor for supporting articles to be sprayed with volatile solvent containing finishing materials and transporting the supported articles through a finish applying zone, a finish applying spray head positioned adjacent one side of the conveyor for spraying finishing materials onto transported articles passing through the zone, and an overspray collection apparatus mounted adjacent the conveyor for collecting any excess of finishing materials delivered by the spray head, an improvement which facilitates controlling emissions of solvent into the atmosphere ambient to the apparatus and comprising:

refrigeration means for chilling said overspray collection apparatus contacted by the finishing materials and thereby for lowering the temperature of liquid finishing materials impinging thereon sufficiently to reduce the vapor pressure of the impinged liquid volatile solvents contained in the collected finishing materials, whereby the volatile solvents are maintained in liquid form and control over the emission thereof is facilitated.

2. In an apparatus having a conveyor for supporting articles to be sprayed with volatile solvent containing finishing materials and transporting the supported articles through a finish applying zone, a finish applying spray head positioned adjacent one side of the conveyor for spraying finishing materials onto transported articles passing through the zone, and an overspray collection reservoir mounted adjacent the conveyor for collecting any excess of finishing materials delivered by the spray head, an improvement which facilitates controlling emissions of solvent into the atmosphere ambient to the apparatus and comprising:

overspray directing means disposed adjacent the conveyor and between the conveyor and the reservoir for receiving materials sprayed through the spray head and which escape adherence to a sprayed article and directing such overspray materials toward the reservoir while protecting against backsplatter toward the sprayed article, and refrigeration means for chilling said overspray directing means and thereby for lowering the temperature of finishing materials impinging thereon and for reducing the vapor pressure of the volatile solvents contained in the finishing materials, whereby the volatile solvents are maintained in liquid form and control over the emission thereof is facilitated.

3. In an apparatus having a conveyor for supporting articles to be sprayed with volatile solvent containing finishing materials and transporting the supported articles through a finish applying zone, a finish applying spray head for spraying finishing materials onto transported articles passing through the zone, and cleaning means for cleaning finishing materials from the conveyor, an improvement which facilitates controlling emissions of solvent into the atmosphere ambient to the apparatus and comprising:

retention means disposed adjacent the conveyor and the cleaning means for receiving and retaining a quantity of liquid solvent for the finishing materials and for supplying retained solvent to the cleaning means, and refrigeration means for chilling liquid solvent in said retention means and thereby reducing the vapor pressure of the retained liquid solvent, whereby the volatile solvents are maintained in liquid form and control over the emission thereof is facilitated.

4. In an apparatus having a conveyor for supporting articles to be sprayed with volatile solvent containing finishing materials and transporting the supported articles through a finish applying zone, a finish applying spray head positioned adjacent one side of the conveyor for spraying finishing materials onto transported articles passing through the zone, and an overspray collection reservoir mounted adjacent the conveyor for collecting any excess of finishing materials delivered by the spray head, an improvement which facilitates controlling emissions of solvent into the atmosphere ambient to the apparatus and comprising:

refrigeration means for chilling the conveyor contacted by the finishing materials and thereby for lowering the temperature of liquid finishing materials impinging thereon sufficiently to reduce the vapor pressure of the impinged liquid volatile solvents contained in the impinged finishing materials, whereby the volatile solvents are maintained in liquid form and control over the emission thereof is facilitated.

5. In an apparatus having a conveyor for supporting articles to be sprayed with volatile solvent containing finishing materials and transporting the supported articles through a finish applying zone, a finish applying spray head positioned adjacent one side of the conveyor for spraying finishing materials onto transported articles passing through the zone, and an overspray collection reservoir mounted adjacent the conveyor for collecting any excess of finishing materials delivered by the spray head, an improvement which facilitates controlling emissions of solvent into the atmosphere ambient to the apparatus and comprising:

refrigeration means for chilling the reservoir contacted by the finishing materials and thereby for lowering the temperature of liquid finishing materials impinging thereon sufficiently to reduce the vapor pressure of the impinged liquid volatile solvents contained in the collected finishing materials, whereby the volatile solvents are maintained in liquid form and control over the emission thereof is facilitated.

6. In an apparatus having a conveyor for supporting articles to be sprayed with volatile solvent containing finishing materials and transporting the supported articles through a finish applying zone, a finish applying spray head positioned adjacent one side of the conveyor for spraying finishing materials onto transported articles passing through the zone, an overspray collection reservoir mounted adjacent the other side of the conveyor for collecting any excess of finishing materials delivered by the spray head, and cleaning means for cleaning finishing materials from the conveyor, an improvement which facilitates controlling emissions of solvent into the atmosphere ambient to the apparatus and comprising:

overspray directing means disposed adjacent the conveyor and between the conveyor and the reservoir for receiving materials sprayed through the spray head and which escape adherence to a sprayed article and directing such overspray materials toward the reservoir while protecting against backsplatter toward the sprayed article, retention means disposed adjacent the conveyor and the cleaning means for receiving and retaining a quantity of solvent for the finishing materials and for supplying retained solvent to the cleaning means, and refrigeration means for chilling said overspray directing means and said retention means and thereby for lowering the temperature thereof and for reducing the vapor pressure of the volatile solvents contained in the finishing materials, whereby the volatile solvents are maintained in liquid form and control over the emission thereof is facilitated.

7. Apparatus according to one of claim 2 or claim 3 or claim 5 and further wherein said refrigeration means is operatively associated with the conveyor for chilling the conveyor.

8. Apparatus according to one of claim 2 or claim 4 and further wherein said refrigeration means is operatively associated with the reservoir for chilling the reservoir.

9. Apparatus according to one of claim 1 or claim 2 or claim 3 or claim 4 wherein said refrigeration means comprises means for circulating a fluid chilled to a temperature at least about five degrees Celsius below the temperature of the atmosphere ambient to the apparatus.

10. Apparatus according to one of claim 2 or claim 6 wherein said overspray directing means comprises a plurality of elongate slat members arranged parallel one to the other.

11. Apparatus according to claim 10 further comprising means for gathering finishing materials from said slat members for recycling of such materials.

12. Apparatus according to claim 10 wherein said slat members are oriented with the lengthwise axis thereof extending widthwise of the conveyor for substantially the entire width of the conveyor and further wherein said slat members have side edges and a predetermined depth extending from the one of said side edges closest to the conveyor toward the reservoir.

13. Apparatus according to claim 12 further comprising means for scraping from said slat members finish materials deposited thereon.

14. Apparatus according to claim 13 wherein said scraping means comprises a plurality of blade means mounted for movement longitudinally of said slat members and for engaging said slat members on depthwise faces thereof.

15. Apparatus according to one of claim 3 or claim 6 wherein said retention means comprises trough means mounted on one side of the conveyor and cover means mounted on the opposite side of the conveyor from said trough means, said trough and cover means defining at least one slot for passage of the conveyor therethrough.

16. Apparatus according to claim 15 wherein said refrigeration means is operatively associated with said cover means for chilling said cover means.

17. An apparatus for spraying a workpiece with a volatile-solvent-containing finishing material and collecting oversprayed finishing material comprising:

a support for the workpiece, a finish applying spray head positioned to one side of said support for spraying the finishing materials on a workpiece supported on said support, and an overspray collection apparatus proximate said support so it collects the overspray and chilled to a temperature low enough to prevent substantial vaporization of collected overspray, whereby the amount of volatile solvent vaporized from the collected finishing material is reduced to a level below that which would be vaporized in the absence of the chilling.

18. An apparatus as claimed in claim 17 further comprising a recirculation line from said collection apparatus to said spray head to facilitate reuse of collected overspray.

19. An apparatus as claimed in claim 18 wherein said overspray collection apparatus is chilled to a temperature low enough to prevent changes to the finishing material which would be deleterious to its recirculation for reuse.

* * * * *